US008504292B1

(12) United States Patent
Côté et al.

(10) Patent No.: US 8,504,292 B1
(45) Date of Patent: Aug. 6, 2013

(54) INDOOR LOCALIZATION BASED ON ULTRASOUND SENSORS

(75) Inventors: Stéphane Côté, Lac Beauport (CA); Gabriel Girard, La Minerve (CA); Sisi Zlatanova, Rotterdam (NL); Yannick Barrette, Québec (CA); Peter van Oosterom, Woudenberg (NL); Johanne St-Pierre, Lac Beauport (CA)

(73) Assignee: Bentley Systems, Incorporated, Exton, PA (US)

( * ) Notice: Subject to any disclaimer, the term of this patent is extended or adjusted under 35 U.S.C. 154(b) by 279 days.

(21) Appl. No.: 13/101,918

(22) Filed: May 5, 2011

(51) Int. Cl.
*G01C 21/10* (2006.01)

(52) U.S. Cl.
USPC .......................... 701/500; 701/492; 701/502

(58) Field of Classification Search
USPC .................. 701/500–510, 514, 519, 530, 492
See application file for complete search history.

(56) References Cited

U.S. PATENT DOCUMENTS

| | | | |
|---|---|---|---|
| 2007/0282565 A1 * | 12/2007 | Bye et al. ...................... | 702/158 |
| 2009/0177437 A1 | 7/2009 | Roumeliotis | |
| 2009/0192708 A1 | 7/2009 | Yoo et al. | |
| 2010/0004860 A1 | 1/2010 | Chernoguz et al. | |
| 2011/0029241 A1 | 2/2011 | Miller et al. | |

OTHER PUBLICATIONS

Wendlandt, Kai, et al., "Indoor Localization with Probability Density Functions Based on Bluetooth," IEEE, Personal, Indoor and Mobile Radio Communications, 2005. PIMRC 2005. IEEE 16th International Symposium on Sep. 11-14, 2005, vol. 3, pp. 1-5.
Fox, Dieter, et al., "Monte Carlo Localization: Efficient Position Estimation for Mobile Robots," Proceedings of the Sixteenth National Conference on Artificial Intelligence (AAAI-99), Orlando, Florida, Jul. 1999, pp. 1-7.
Beauregard, Stephane, et al., "Pedestrian Dead Reckoning: A Basis for Personal Positioning," Proceedings of the 3$^{rd}$ Workshop on Positioning, Navigation and Communication (WPNC'06), Mar. 16, 2006, pp. 27-36.
Wendlandt, Kai, et al., "Demonstration of a Realtime Active-Tag RFID, Java Based Indoor Localization System using Particle Filtering," May 7, 2009, pp. 1-4.
Renaudin, Valerie, et al., "Indoor Navigation of Emergency Agents," Reed Business-Geo, European Journal of Navigation, vol. 5, No. 3, Jul. 2007, pp. 1-10.

(Continued)

*Primary Examiner* — Richard M. Camby
(74) *Attorney, Agent, or Firm* — Cesari and McKenna, LLP

(57) ABSTRACT

In one embodiment, a technique for determining a position of a user inside of a structure is disclosed. Acceleration and orientation data is captured by an inertial motion unit (IMU) affixed to the user. Range data is captured by one or more range finders affixed to the user. An estimate of the user's relative displacement is produced based on the acceleration and orientation data captured by the IMU. A cloud of particles is generated within a model of the structure based on the estimated relative displacement. One or more particle filters are applied to the cloud of particles to eliminate any particles of the cloud of particles that violate physical constraints and to eliminate any particles of the cloud of particles that are inconsistent with the range data. Then a statistical function is applied to the cloud of particles to determine a calculated position of the user.

20 Claims, 5 Drawing Sheets

OTHER PUBLICATIONS

Wendlandt, Kai, et al., "Continuous Location and Direction Estimation with Multiple Sensors Using Particle Filtering," Proceedings of the International Conference in Multisensor Fusion and Integration for Intelligent Systems, IEEE Verlag. MFI 2006, Sep. 4, 2006 to Sep. 6, 2006, Heidelberg, Germany. pp. 1-6.

Krach, Bernhard, et al.,"Cascaded Estimation Architecture for Integration of Foot-Mounted Inertial Sensors," IEEE, Position, Location and Navigation Symposium, 2008 IEEE/ION, Monterey, CA, May 5-8, 2008, pp. 1-8.

Chawathe, Sudarshan, "Beacon Placement for Indoor Localization Using Bluetooth," IEEE, Intelligent Transportation Systems, 2008. ITSC 2008. 11th International IEEE Conference on Oct. 12-15, 2008, Beijing, China, pp. 1-6.

Kourogi, Masakatsu, et al., "Pedestrian Dead Reckoning and Its Applications," Proceedings of "Let's Go Out" Workshop in conjunction with ISMAR09, Oct. 29, 2009, Orlando, Florida, pp. 1-2.

Woodman, Oliver, et al., "RF-Based Initialisation for Inertial Pedestrian Tracking," Pervasive, Seried Lecture Notes in Computer Science, vol. 5538/2009, Springer Berlin, Heidelberg, May 2009, pp. 1-18.

Beauregard, Stephane, et al., "Omnidirectional Pedestrian Navigation for First Responders," Proceedings of the 4th Workshop on Positioning Navigation and Communication (2007) (WPNC'07), Hannover, Germany, Mar. 22, 2007, pp. 1-4.

Fischer, Carl, et al., "Ultrasound-Aided Pedestrian Dead Reckoning for Indoor Navigation," Proceedings of the first ACM International, MELT'08, Sep. 19, 2008, San Francisco, California, pp. 1-6.

Woodman, Oliver, et al., "Pedestrian Localization for Indoor Environments," Ubi Comp, vol. 344, Proceedings of the $10^{th}$ International Conference on Ubiquitous Computing, Seoul, Korea, Sep. 2008, pp. 1-10.

* cited by examiner

INDOOR LOCALIZATION BASED ON ULTRASOUND SENSORS

BACKGROUND

1. Technical Field

The present disclosure relates generally to position determination, and more specifically to techniques for precisely determining a user's position inside of a structure.

2. Background Information

A variety of classes of applications may require precise determination of a user's position inside of a structure (e.g., a building). One class of applications that may require a precise fix of a user's position inside of a structure is augmented reality (AR) applications. In an example AR application, a portable system may capture images of the structure and supplement them to provide an AR view, where computer-generated graphics and/or text are overlaid upon the captured images. Such graphics and/or text may describe, among other things, features that are normally hidden from view inside the structure, such as pipes, ventilation ducts, wiring, and/or other infrastructure, and provide information concerning their properties and requirements. Time may be saved by allowing the user to readily "see" the location of such infrastructure, and learn about its properties, without opening walls or ceiling bays, or consulting supplemental information sources (e.g., paper documents). However, in order to overlay the correct graphics and/or text at the correct locations to create an AR view, it is necessary to precisely determine the position inside of the structure from which the underlying images of the structure are being captured (i.e., the position of the user). Errors in the determination of this position may lead to incorrect graphics and/or text being overlaid at incorrect locations, and may substantially reduce the benefits of an AR view.

Another class of applications that may require a precise determination of a user's position inside of a structure is user guidance applications. While a variety of types of users may require some sort of guidance when moving about within a structure, user guidance is particularly important in emergency-response situations. A first responder, such as a firefighter, is often called upon to move about an unfamiliar structure, in which visibility is impaired (for example, due to smoke, darkness, etc.). Should a first responder become disoriented, they may be unable to assist others, and may require assistance themselves, compounding the emergency situation. It may be desirable to provide a first responder with an emergency-response guidance system that would, for example, visually display their position upon a map of the structure. However, for such a mapping system to be safe and useful, the indicated location must be precise. Even a small error in position may disorient and endanger a first responder. For example, should the error falsely indicate the first responder is on one side of a wall, in a space that has a route to a nearby exit, when they truly are on the other side of the wall, and thus cut off from the exit, a first responder may become trapped.

There are a number of existing techniques that can be used to determine, or at least attempt to determine, a user's location inside of a structure. Such systems generally fall into two categories: prepared tracking environment systems and unprepared tracking environment systems.

In prepared tracking environment systems, devices such as radio-frequency identification (RFID) emitters, beacons, and the like, are pre-positioned at specific locations inside of a structure. These pre-positioned devices may later be detected by a sensor carried by the user, and utilized to determine the user's position within the structure. While such prepared tracking environment systems may provide reasonable position accuracy, the need to pre-position devices renders them impractical for many applications. For instance, they may be unsuited for use with many AR applications, as the time needed to pre-position the devices may negate the potential time savings achieved by providing an AR view. Similarly, they may be unsuited for use with guiding a user, for example, a first responder in an emergency situation, due to the time and care needed to pre-position the devices.

In unprepared tracking environment systems, a user's position is determined without reliance on pre-positioned devices within the structure. While this addresses some of the issues of prepared tracking environment systems, existing unprepared tracking environment systems have their own host of problems and shortcomings.

Some existing unprepared tracking environment systems attempt to use image data captured within the structure to determine a position of the user within the structure. For example, an image-based technique may compare an image captured by a camera carried by the user with a database of images of the interior, and estimate the potential position of the user based on this comparison. While in ideal situations, such image-based techniques may function, they are hindered by a number of practical issues. Given similarities between different portions of the structure (e.g., each level of a multi-level structure may have an identical floor plan and thus may "look alike") the captured image data may be insufficient to unambiguously determine the user's position. Further, considerable processing power it typically needed to analyze and process the image data. Still further, image-based techniques are typically inoperative in situations where visibility is impaired inside of the structure (for example, due to smoke, darkness, etc.), and therefore are unsuitable for emergency-response guidance systems.

Other existing unprepared tracking environment systems attempt to utilize inertial tracking to determine the position of the user in the structure. In such techniques, one or more accelerometers may be carried by, or attached to, the user, and utilized to estimate the relative displacement of the user from a known starting position. The acceleration data returned by the accelerometer may be double integrated over time to yield linear displacement data. The linear displacement data may then be used to determine the user's present position within the structure. While in theory, this is all that should be needed to determine the position of the user, in practice there are a number of issues that render such simple techniques unworkable. Foremost is the issue of accelerometer drift. Even very small errors in measurement (e.g., due to bias, noise, etc.) in the measured acceleration are amplified tremendously as a result of the double integration over time. After the user has taken a few footsteps, the user's calculated position typically will differ so much from their real position that the calculated position is practically meaningless.

Some attempts have been made to mitigate the issue of accelerometer drift in inertial-tracking position determination systems by zeroing, or resetting, the drift periodically. One such technique involves affixing the accelerometer to the foot of the user, and detecting the user's footsteps. At each footstep, when the user's foot touches the ground, it may be assumed that the speed of the accelerometer with respect to the ground is zero, and the integration of acceleration may be re-initialized, resetting accelerometer drift. Such a technique is commonly referred to as a "zero velocity updates" technique. However, while such technique may reduce the problem of accelerometer drift somewhat, the precision of the calculated position is still inadequate for many applications.

Another technique for mitigating the issue of accelerometer drift in inertial-tracking position determination systems involves use of a computer-implemented model of the structure and particle filtering. In such a technique, rather than directly utilize the linear displacement data determined from the accelerometer, the user's position is approximated by a cloud of particles inside a computer-implemented model of the structure. Using model features (e.g. walls or other obstacles) the cloud of particles is reduced or filtered to yield a user's most plausible position. Specifically, every time the user moves, several new particle are created inside the model, the new particles being scattered in the believed direction of the user's movement, but differing by a small amount. Then, each particle that violates a physical constraint represented in the model is eliminated. For example, particles that represent "impossible positions", which could only be achieved if a user had taken some impossible, or at least highly unlikely action, such as having just walked through a wall, are eliminated. The elimination of particles that represent "impossible positions" reduces the cloud of particles. The cloud of particles is then used to determine a position of the user.

Yet, while such a technique may offer improved precision, even this improved precision may be inadequate for many applications. With this technique, precision of the user's position is highly dependent on the nature of the indoor environment in which the user is located. When there are few, or no, physical constraints nearby the user, particles cannot be effectively eliminated. For instance, a user who is moving though a large open area (e.g., a large room) within a structure may be free to move in any direction without encountering any physical constraint (e.g., hitting a wall), and because of this, the number of particles in a cloud of particles that represents their potential position may not readily be reduced.

What is needed is an improved technique for determining a user's position inside of a structure that may be used in an unprepared tracking environment and that is precise in a variety of interior environments, including interior environments in which there are few, or no, obstacles nearby the user.

SUMMARY

In one embodiment, the shortcomings of the prior art are addressed by a novel indoor localization technique that determines a user's position inside a structure using acceleration and orientation data from an inertial motion unit (IMU), information regarding the interior layout of the structure obtained from a structure model, application of particle filtering techniques, and range information from the one or more range finders.

After a starting position of the user within the structure has been initialized, acceleration and orientation data captured by the IMU may be used to estimate the user's relative displacement, for example, utilizing a "zero velocity updates" technique. This measured relative displacement, may be used in generating a new cloud of particles inside the structure model, where each particle represents a possible position of the user. Such a cloud of particles may be produced by generating a set of motion vectors that fall within an estimated error size from the measured displacement, and applying each of these motion vectors to any particles of an existing cloud of particles. Thereafter, particle filtering techniques may be applied to eliminate particles from the new particle cloud that correspond to "impossible positions", where a particle corresponds to a position that could only be achieved if a user had violated some physical constraint (for example, had just walked through a wall or other obstruction), as well as "implausible positions", where a particle corresponds to a position that is inconsistent with the measured distance to physical constraints (e.g., walls or other obstructions) returned by the one or more range finders. By introduction of range data from the one or more range finders, far more particles may be eliminated than techniques that look to only "impossible positions" and do not consider range data. Thereby, a far more compact cloud of particles may be produced, to which a statistical function (e.g. a weighted average) may be applied to produce a calculated position of the user. As the user moves, the technique may be repeated, to produce successive clouds of particles based on the prior particles clouds, and thereby successive calculated positions of the user.

BRIEF DESCRIPTION OF THE DRAWINGS

The detailed description below refers to the accompanying drawings, of which.

DETAILED DESCRIPTION

I. Definition of Terms

As used herein the term "portable electronic device" shall be understood to refer to an electronic device readily transportable by a user, for example, adapted to be carried by the user on their person. A "portable electronic device" may be an ultra mobile personal computer (PC) (collectively UMPC), a tablet PC, a personal digital assistant (PDA), a portable mapping unit, a smartphone, or other similar type of electronic device.

As used herein the term "inertial motion unit" (IMU) shall be understood to refer to a sensor that is capable of detecting at least acceleration and orientation. An IMU may utilize one or more gyroscopes or other devices in reference to gravity and or the magnetic north pole. An IMU may be packaged as a single integrated device, or may include separate components that are interconnected together.

As used herein the term "range finder" shall be understood to refer to a sensor that is capable of determining a distance to a physical constraint (e.g., a wall or other obstruction) within a structure. A range finder may be an ultrasonic range finder, or alternatively any of a variety of other types of sensors, such as a ranging camera, a stereo camera, a Light Detection And Ranging (LIDAR) sensor, etc.

As used herein the term "affixed" shall be understood to refer to something being attached to directly or indirectly, carried by, or otherwise caused to be collocated with. For example, something that is secured to an article of clothing of a user would considered to be "affixed" to the user. Further, something that is integrated into a device which is carried by, or otherwise caused to be move with, a user would also be considered to be "affixed" to the user, despite the lack of a direct mechanical attachment between the two.

II. Example Embodiments

Figure 1:
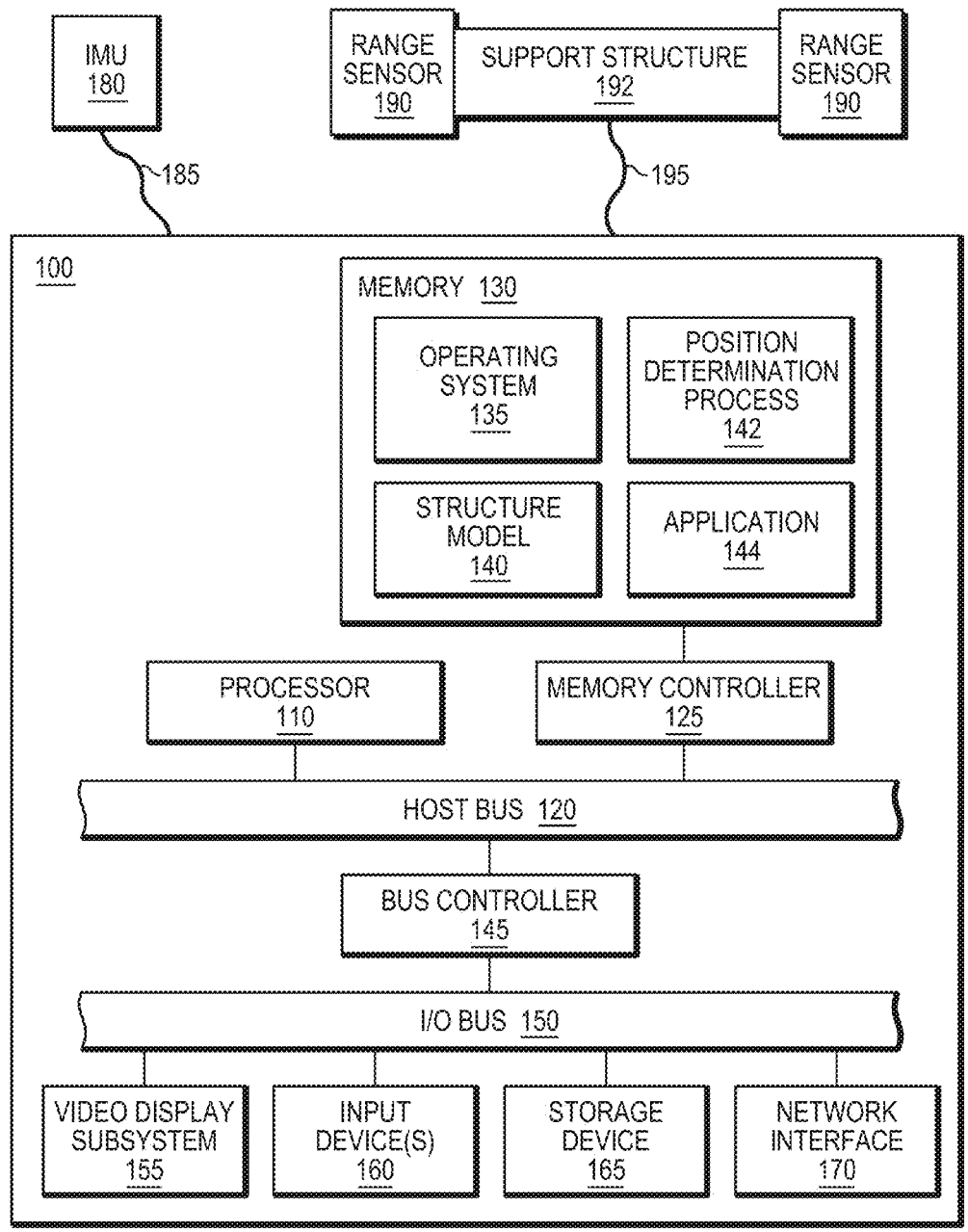
FIG. 1 is a schematic block diagram of an example portable electronic device carried by a user in which at least some of the presently described techniques may be employed.

FIG. 1 is a schematic block diagram of an example portable electronic device 100 carried by a user in which at least some of the presently described techniques may be employed. The portable electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM), is coupled to the host bus 120 via a memory controller 125. The memory 130 is adapted to store at least a portion of computer-executable instructions and data for an operating system 135 while the portable electronic device 100 is operating. In addition, the memory 130 may store at least portions of computer-executable instructions and data for a structure model 140, a position determination process 142 and an application 144 that consumes position data. The structure model 140 may be a drawing (DWG) file, a design (DGN) file, or another type of electronic representation that describes the interior configuration of a structure (e.g. a building). The position determination process may be an independent software application, or a sub-routine or other type of sub-portion of another application, such as application 144, that precisely determines the position of a user within a structure according to the techniques described herein. The application 144 that consumes position data may be any of a variety of types of applications, for example, an augmented reality (AR) application, a user guidance application, or another type of application that makes use of a precisely determined location of a user within a structure for some purpose.

The host bus 120 of the portable electronic device 100 is coupled to an input/output (I/O) bus 150 through a bus controller 145. A video display subsystem 155, which may include a display screen and hardware to drive the display screen, is coupled to the I/O bus 150. The display screen, among other functions, may show a user interface of the application 144. One or more input devices 160, such as a keyboard, a touchpad, separate controls (e.g., separate buttons, switches, sliders) etc., are provided and used for interaction with the portable electronic device 100, and the application 144 executing on the portable electronic device. A persistent storage device 165, such as hard disk drive, a solid-state drive, or other type or persistent data store, is coupled to the I/O bus 150, and may persistently store data, including computer-executable instructions and data, that are available to be loaded to the volatile memory 130 when needed. For example, computer-executable instructions and data for the operating system 135, the structure model 140, the position determination process 142, and the application 144 that consumes position data, may be stored in the persistent storage device 165. The I/O bus 150 may further be coupled to a network interface 170 that interfaces with a computer network (not shown). The computer network may allow communication between the portable electronic device 100 and other devices, using any of a number of well known networking protocols, including wireless networking protocols.

An IMU 180 is coupled to the portable electronic device 100, for example, by a wired or wireless link 185. The IMU is affixed (attached to directly or indirectly, carried by, or otherwise caused to be collocated with) to the user and returns acceleration and orientation data descriptive of the user's movements. In one embodiment, the IMU (or at least a portion of the IMU) is attached to the foot of the user, such that the user's footsteps may be detected and used with a "zero velocity updates" technique for position determination. It should be understood that the IMU (or at least a portion of the IMU) may be attached to the foot of the user in a verity of manners. For example, in a simple implementation, the IMU may be simply fastened to the exterior of the user's shoe, using a mechanical fastener (e.g., Velcro, clips, etc.). Alternatively, the IMU (or at least a portion of the IMU) may be built into the shoe, for example, sewn between layers of fabric, formed into the sole, etc.

One or more range finders 190 are also coupled to the portable electronic device 100, for example, by a wired or wireless link 195. The one or more range finders 190 are also affixed (attached to directly or indirectly, carried by, or otherwise caused to be collocated with) to the user. In one embodiment the one or more range finders 190 are attached to the portable electronic device 100 that is in turn carried by the user, and thereby so affixed to the user. The one or more range finders 190 are configured to measure distances to physical constraints (e.g., surrounding walls or other obstructions) within the structure. In one embodiment, the range finders 190 are ultrasonic range finders that include a piezoelectric crystal that is periodically excited to produce cyclic compression waves of a frequency normally exceeding 40 kHz. The waves then travel through the air, hit obstructions, and bounce back. By measuring the round trip time between the emission of the wave and its reception back at the ultrasonic range finder, the ultrasonic range finder can determine the distance traveled by the wave and thereby a range to obstructions.

In one embodiment, two range finders 190 are secured to a support structure 192 that directs the range finders to lateral sides of the user (i.e., to the left and to the right of the of the user, perpendicular to the user's primary direction of travel). It has traditionally been difficult to accurately determine lateral movement of a user, since the magnitude of lateral movement is typically far less than the magnitude of the user's movement along their primary direction of travel. Accordingly, collection of range data in directions perpendicular to the user's primary direction of travel may be advantageous. It should be understood, however, that in alternative embodiments different numbers of range finders 190 may be employed, and pointed in a variety of different directions. For example, in another embodiment, three range finders 190 may be employed, with the third range finder (not shown) disposed pointing forwards, in the user's primary direction of travel. Similarly, in still another embodiment, a fourth range finder (not shown) may be employed disposed pointing backwards, away from the user's primary direction of travel. In yet other embodiments, range finders may point upward and/or downward to detect the distance to a ceiling and/or floor. Such upward and/or downward point range finders may be of use in determining when an elevation change occurs, for example, if a user is in a stairway. Numerous other configurations are similarly possible.

In some embodiments, a support structure 192 may be coupled to the portable electronic device 100, and it may be assumed that user will hold the portable electronic device in such a manner that the range finders 190 are oriented in the intended directions relative to the user. In other embodiments, the support structure 192 may be coupled to the user, for example, integrated into headwear, or some article of clothing, worn by the user, which may help ensure the range finders 190 are oriented in the intended relative directions.

The above hardware components may be utilized by the position determination process 142 to precisely determine the location of a user within a structure through a combination of acceleration and orientation data from the IMU 180, information regarding the interior layout of the structure obtained from the structure model 140, application of particle filtering techniques, and range information from the one or more range finders 190. After a starting position of the user within the structure has been initialized, acceleration and orientation data captured by the IMU 180 may be used to estimate the user's relative displacement using, for example, a "zero velocity updates" technique. This estimated relative displacement, may be utilized in generating a new cloud of particles inside the structure model, where each particle represents a possible position of the user. Such a cloud of particles may be produced by generating a set of motion vectors that fall within an estimated error size from the estimated displacement, and applying each of these motion vectors to any particles of an existing cloud of particles. Thereafter, particle filtering techniques may be applied to eliminated particles from the new particle cloud that correspond to "impossible positions", where a particle corresponds to a position that could only be achieved if a user had violated some physical constraint (for example, had just walked through a wall or other obstruction), as well as "implausible positions", where a particle corresponds to a position that is inconsistent with the measured distance to physical constraints (e.g., walls or other obstructions) returned by the one or more range finders. By introduction of range data from the one or more range finders 190, far more particles may be eliminated than techniques that look to only "impossible positions" and do not consider range data. Thereby, a far more compact cloud of particles may be produced, to which a statistical function (e.g. a weighted average) may be applied to produce a calculated position of the user.

Figure 2:
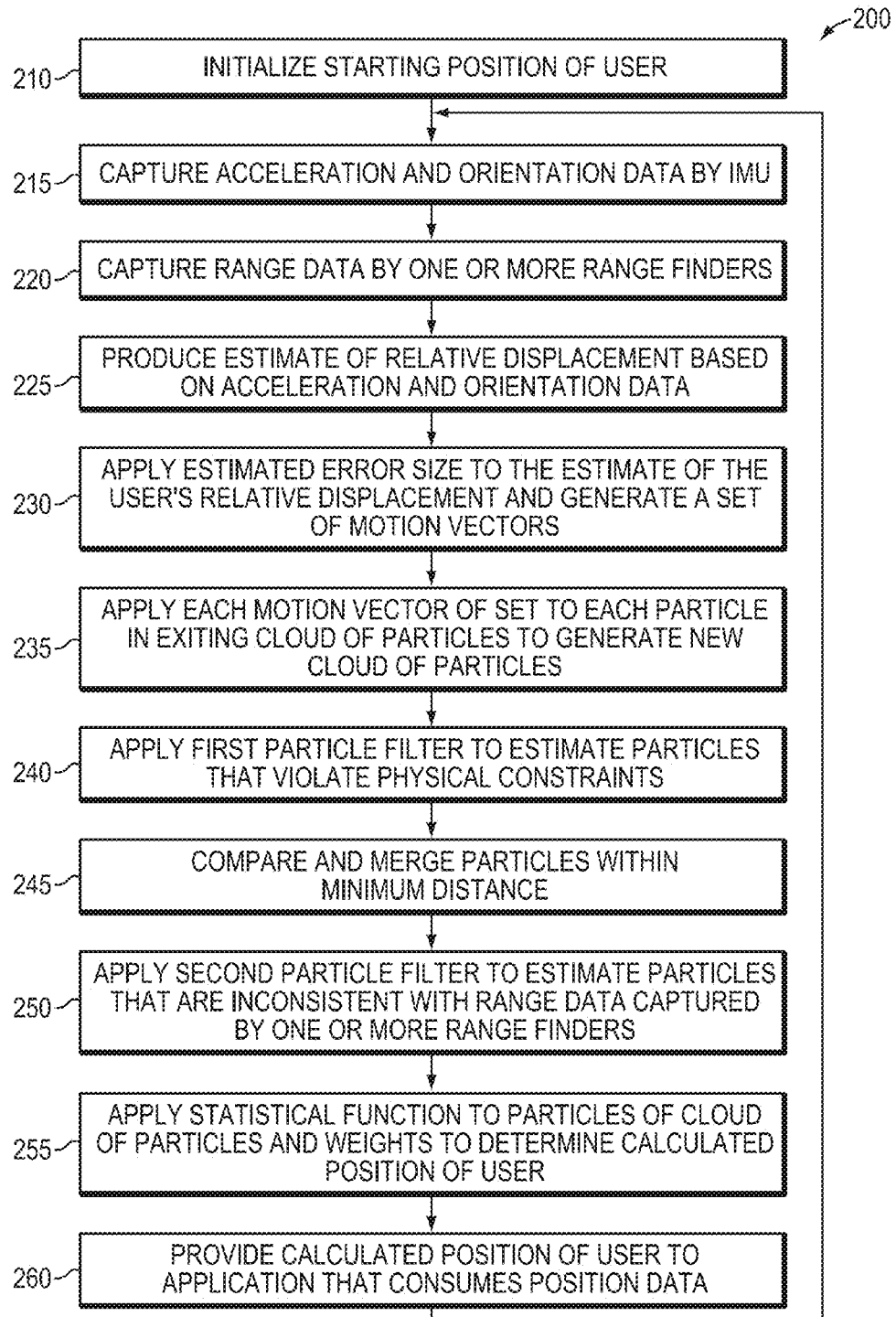
FIG. 2 is flow diagram illustrating an example sequence of steps that may be implemented by a position determination process to precisely determine a user's position.
Figure 3:
FIG. 3 is a graphic representation of a portion of a structure model of an example structure, showing example movement of the user.

FIG. 2 is flow diagram illustrating an example sequence of steps 200 that may be implemented by a position determination process 142 to precisely determine a user's position. The sequence of steps will be discussed in relation to an example movement of a user through an example structure, for illustrative purposes. FIG. 3 is a graphic representation 300 of a portion of a structure model 140 of an example structure, showing an example movement of the user. In the example movement, the user walks successively through positions 1-10 (i.e. walks from 1 to position 2, from position 2 to position 3, from position 3 to position 4, etc.) It should be understood that the techniques discussed herein are applicable to far more complex structure layouts, and far more complex movements by a user, and that the simplicity of this example is simply for illustrative purposes.

At step 210, a starting position of the user within the structure, and thereby within the structure model, is initialized. For instance, it may be initialized that the user is at position 1 in FIG. 3. The starting position may be initialized in any of a variety of manners. In one embodiment, the user manually initializes his or her starting position by making a selection upon a map of the structure, that is, for example, shown on a display screen of the portable electronic device. In another embodiment, the starting position of the user is automatically determined, for example, to coincide with an entrance to the structure or other known location. As part of the initialization, a single particle representing the initialized position of the user is added to a cloud of particles in the structure model 140. For instance, referring to FIG. 3, given the user starts at position 1, a single particle is placed at position 1 and this constitutes the initial cloud of particles.

At step 215, acceleration and orientation data descriptive of movement by the user are captured by the IMU 180, for example, an IMU 180 secured to the foot of the user. At step 220, range data to descriptive of distances to physical constraints (e.g., walls) within the structure is captured by the one or more range finders 190.

At step 225, an estimate of the user's relative displacement is produced based on the acceleration and orientation data captured from the IMU 180. In one embodiment, where the IMU 180 (or at least a portion of the IMU 180) is mounted to the foot of the user, estimate is triggered in response to detection of a footstep, and the length and orientation of the user's movement is determined utilizing a "zero velocity updates" technique. According to such a technique, acceleration data returned by the IMU is double inters grated over time to yield linear displacement data. The speed of the IMU with respect to the ground is assumed to be zero at the beginning of each footstep, and the integration of acceleration may is re-initialized, resetting drift, at each footstep.

Figure 4A:
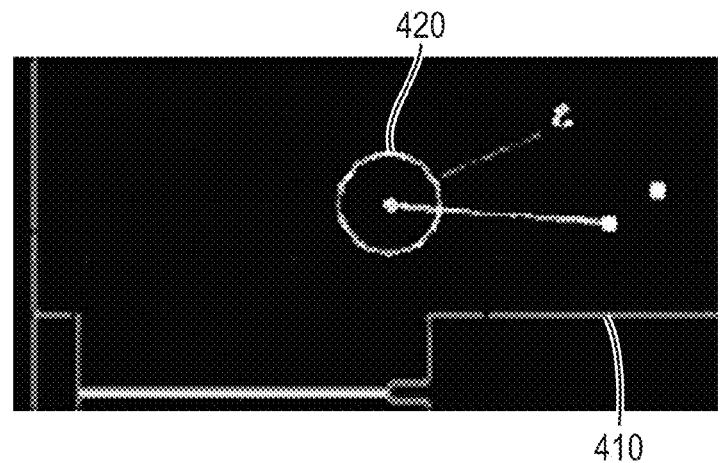
FIG. 4A is a first enlargement of a portion of FIG. 3, showing measured movement represented as an example motion vector.

At steps 230-235, a cloud of particles is generated within the structure model based on the estimate of the user's relative displacement, where each particle represents a possible position of the user. More specifically, at step 230, an estimated error size $\epsilon$ is applied to the estimated of the user's relative displacement and a set of $\kappa$ motion vectors that fall within the estimated error size from the endpoint of the estimated relative displacement are generated. For instance, referring to FIG. 4A, which is a first enlargement of a portion of FIG. 3, the estimated movement from the IMU 180 may be represented as an example motion vector 410. The estimated error size $\epsilon$ may be represented as a radius 420 around the endpoint of the motion vector 410. Such estimated error size $\epsilon$ may the considered a "confidence level" in the accuracy of the IMU measurements which are used to produce motion vector 410. The value of estimated error size $\epsilon$ may be chosen during the design of the system based on a number of factors. Larger values may result in a decrease in the overall precision of the position determination. However, if the value is too small, the technique may underestimate the potential error in measurements, and lead to situations that may not readily be handled.

Figure 4B:
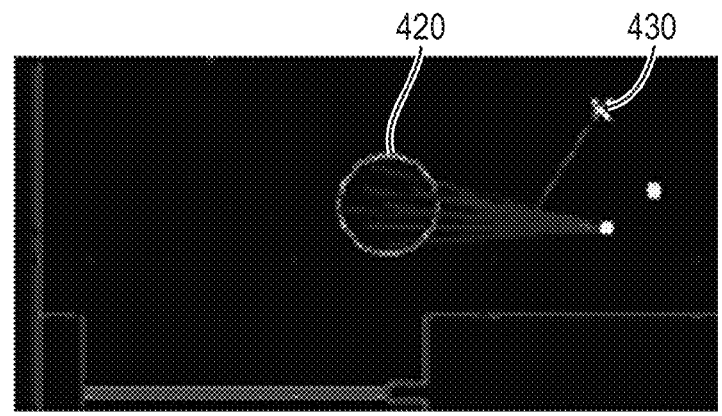
FIG. 4B is a second enlargement of a portion of FIG. 3 showing an example set of motion vectors whose ends fall within a radius.

Referring to FIG. 4B, which is a second enlargement of a portion of FIG. 3, a set of $\kappa$ example motion vectors 430 whose ends fall within the radius 420 are randomly generated. The value of $\kappa$ (i.e., the number of motion vectors in the set) may be chosen during the design of the system based on a number of factors. The value should be set sufficiently high to provide a relatively uniform distribution of vectors to properly represent user motion within the area enclosed by $\epsilon$. However, the higher the value of $\kappa$, the more time will be required to calculate the potion of particles in subsequent steps.

Figure 4C:
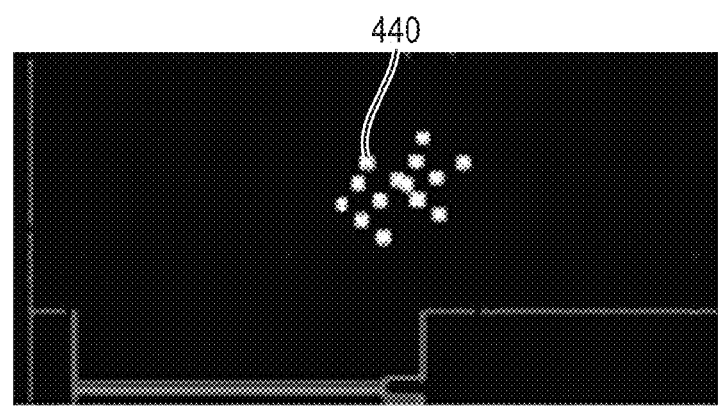
FIG. 4C is a third enlargement of a portion of FIG. 3 showing an example new cloud of particles generated from the example set of motion vectors.

At step 235, each of motion vectors of the set of $\kappa$ motion vectors generated in step 230 are applied to each of the particles of the existing cloud of particles to generate a new cloud of particles that represent new possible positions of the user after their movement. For the user's first movement, the existing cloud of particles would include a single particle representing an initialized position of the user. For subsequent movements, due to repeated application of the sequence of steps of FIG. 2, the existing cloud of particles will contain a plurality of particles. Referring to FIG. 4C, which is a third enlargement of a portion of FIG. 3, application of the set of κ motion vectors 430 to particle 440 of the existing cloud of particles may generate a new example cloud of particles 440.

At step 240, a first particle filter may be applied to eliminate that that violates a physical constraint represented in the structure model 140. For example, particles that represent "impossible positions", which could only be achieved if a user had taken some impossible, or at least highly unlikely action, such as having just walked through a wall, are eliminated. Once the new cloud of particles is generated, the existing cloud of particles is removed.

At step 245, particles of the new cloud of particles are compared, and those particles that are within a minimum distance τ of each other are merged into a single particle. The merging of nearby particles may help maintain the number of particles in the cloud of particles at a management number. Multiple particles having nearly identical positions increases computation requirements, but do not meaningfully increase position determination accuracy. While particles may be merged in a variety of different manners, in one embodiment, merging is based upon a "weight" that is assigned to the particles (as discussed further below), and particles with lesser weights are removed and their weights added to the particle(s) having the initially greater weight, to increase them to be even greater.

At step 250, a second particle filter is applied to eliminate particles from the new cloud of particles that are implausible in light of distances to physical constraints (e.g., walls or other obstructions) in the structure measured by the one or more range finders 190. As part of the step, an evaluation is performed to determine if the distance between particles of the new cloud of particles to representations of physical constraints in the structure model 140 are consistent with the measured distances to physical constraints returned by the one or more range finders 190. Each particle in the new cloud of particles is assigned a weight that is set proportionally to the similarity between 1) the distance in the model to a representation of the physical constraint (e.g. wall) and 2) the distance measured by the one or more range finders 190 to the actual physical constraint (e.g. wall). Such a weight assignment may be mathematically represented as:

$$\omega_i = \frac{1}{\eta} \sum_{k=0}^{\eta} \frac{\delta_k}{\Delta_k}$$

Where $\omega_i$ is the weight of particle i, $\delta_k$ is the distance in the model corresponding to the range finder k, $\Delta_k$ is the distance measured by the range finder k, and n is the number of range finders. The number of particle in the new cloud of particles is reduced by eliminating particles that are implausible, i.e., having the lowest weights ω, to keep a maximum number of particles v.

This reduction in the number of particle may lower computational requirements such that the position determination process 142 can determine the position of the user substantially in real-time. The maximum number of particles v may be chosen to have a value large enough to ensure a relatively uniform distribution of particles within the cloud of particles, such that there are not significant "holes," yet small enough such that substantially real-time operation is possible given processing constraints. Each particle in the reduced cloud of particles produced represents a potential position of the user having a weight correlating to its probability of it being correct.

Figure 5A:
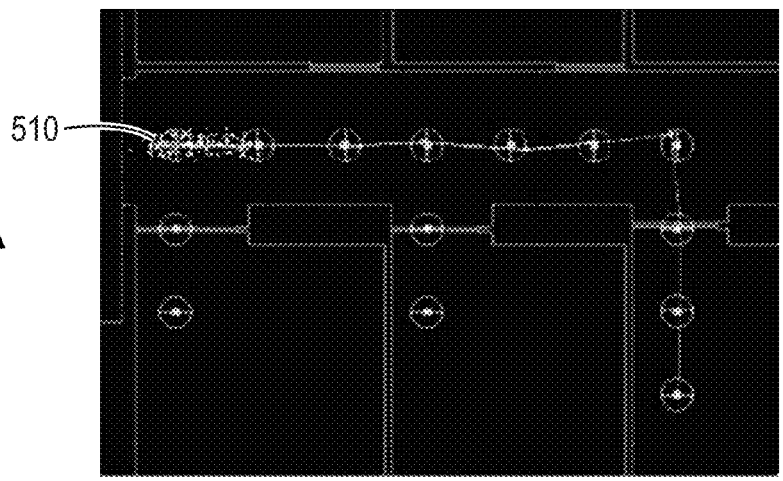
FIG. 5A is a first depiction showing an example cloud of particles overlaid on the graphic representation of FIG. 3 after 9 example footsteps of the user.
Figure 5B:
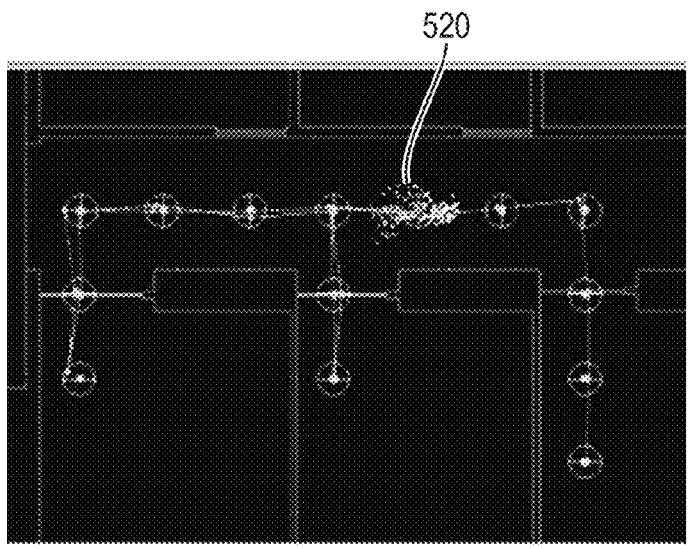
FIG. 5B is a second depiction showing an example cloud of particles overlaid on the graphic representation of FIG. 3 after 21 example footsteps of the user.
Figure 5C:
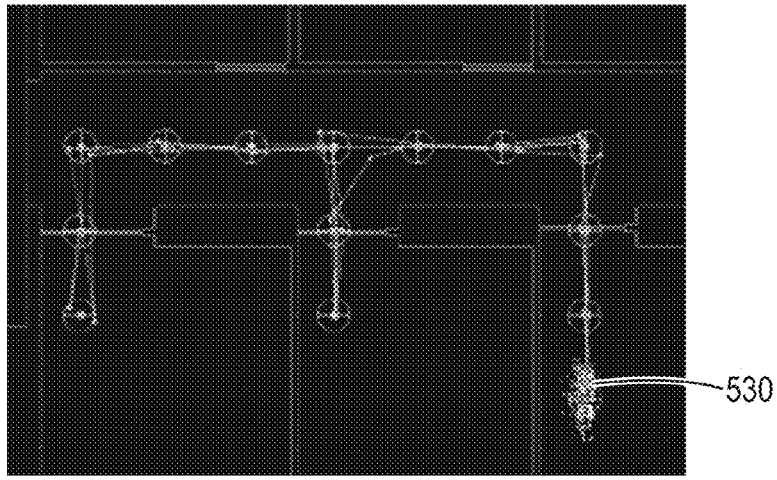
FIG. 5C is a first depiction showing an example cloud of particles overlaid on the graphic representation of FIG. 3 after 52 example footsteps of the user.

The clouds of particles produced by iterative applications of the steps of FIG. 2 are illustrated in FIGS. 5A-5C, which shows example clouds of particles overlaid on the graphic representation 300 of FIG. 3, after 9 footsteps, 21 footsteps and 52 footsteps, respectively of a user repeatedly walking from position 1 to position 10. As can be seen, the cloud of particles 510 in FIG. 5A after 9 steps, the cloud of particles 520 in FIG. 5B after 21 steps, and the cloud of particles 530 in FIG. 5C after 52 step are all relatively compact.

At step 255, the position determination process 142 determines a calculated position of the user by application of a statistical function to the particles in the cloud of particles and their respective weights. In one embodiment, the statistical function is a weighted average of all the particles in the cloud of particles, which may be mathematically represented as:

$$\rho_\mu = \frac{\sum_{i=0}^{v} \omega_i \rho_i}{\sum_{i=0}^{v} \omega_i}$$

where $\rho_\mu$ is the calculated position of the user, $\rho_i=(x_i,y_i)$ is the position of a particle i according to a coordinate system, $\omega_i$ is the weight of particle i, and v is the number of particles.

At step 260, the calculated position of the user $\rho_\mu$ is provided by the position determination process 142 to the application 144 that consumes position data, where it is utilized and potentially displayed to a user. For example, if the application 144 is an AR application, the calculated position may be utilized by the application in production of an AR view, where computer-generated graphics and/or text are overlaid upon captured images of the surroundings of the user. Likewise, if the application 144 is a user guidance application, the calculated position may be used to display an icon or other representation on a map of structure, for example, a map displayed on a display screen of the portable electronic device 100 so the user may see where they are located.

After step 260 execution may loop back to step 215 and the entire sequence repeats again with generation of new motion vectors, application of these motion vectors to create a new cloud of particles at step, and so forth. The sequence may continue to loop, until the user exits the structure, or the position of the user is no longer needed. As discussed above, it should be understood that by introduction of range data from the one or more range finders 190, far more precise calculated positions of the user may be returned than is possible with techniques that do not integrate range data into the calculation of the user's position. Thereby substantial advantages may be achieved over prior techniques.

While the above description discusses various embodiments of the present disclosure, it should be apparent that a number of modifications and/or additions may be made without departing from the disclosure's intended spirit and scope.

For example, while the position determination process 142 and the application 144 that consumes position data are both shown fully resident in the portable electronic device 100 in FIG. 1, one, both, or a portion of one or both, of these software processes may alternatively be disposed on one or more other electronic devices in communication with the portable electronic device 100. For example, the portable electronic device 100 may be configured to merely collect raw data from IMU 180 and one or more range finders 190, and transmit such raw data via network interface 170 to a remote electronic device which hosts the position determination process 142 and implements some, or all, of the steps shown in FIG. 2 to determine the user's position. A determined location may then be returned via the network interface 170 back to the portable electronic device 100.

Alternatively, the portable electronic device 100 may be configured to locally determine the position of the user, but then, rather than use such position locally, may provide such position over the network interface 170 to a remote electronic device that includes an application 144 that consumes the position information. Accordingly, it should be understood that the techniques described herein are applicable to a variety of remote, distributed and collaborative computing configurations.

Finally it should be understood that the above described techniques may be implemented in software, in hardware, or a combination thereof. A software implementation may include executable instructions stored in a non-transitory computer-readable medium, such as a volatile or persistent memory, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as one or more hardware components. Accordingly, it should be understood that the above descriptions are meant to be taken only by way of example.

What is claimed is:

1. A method for determining a position of a user inside of a structure, comprising:
   capturing acceleration and orientation data by an inertial motion unit (IMU) affixed to the user descriptive of acceleration and orientation of the user;
   capturing range data by one or more range finders affixed to the user descriptive of distances from the user to physical constraints within the structure;
   producing an estimate of the user's relative displacement based on the acceleration and orientation data captured by the IMU;
   generating a cloud of particles within a model of the structure based on the estimate of the user's relative displacement, wherein each particle of the cloud of particles represents a possible position of the user;
   applying one or more particle filters to the cloud of particles to
      eliminate any particles of the cloud of particles that violate physical constraints, and
      eliminate any particles of the cloud of particles that are inconsistent with the range data captured by the one or more range finders; and
   applying a statistical function to the cloud of particles to determine a calculated position of the user.

2. The method of claim 1 further comprising:
   initializing a starting position of the user by creating an existing cloud of particles.

3. The method of claim 2, wherein the initializing is in response to receipt of a manual selection of the starting position from the user on a map of the structure.

4. The method of claim 1 wherein the generating further comprises
   applying an estimated error size to the estimate of the user's relative displacement;
   generating a set of motion vectors that fall within the estimated error size;
   applying each motion vector of the set to each particle in an existing cloud of particles to generate a new cloud of particles.

5. The method of claim 1, comprising:
   comparing particles of the cloud of particles; and
   merging any particles that are within a minimum distance of each other into a single particle.

6. The method of claim 1, wherein particles of the cloud of particles are determined to be inconsistent with the range data based on a weight assigned to each of the particles that is proportional to similarity between a distance in the model from the particle to a representation of the physical constraint, and a distance from the user to physical constraints within the structure.

7. The method of claim 1, wherein the statistical function is a weighted average of the particles in the cloud or particles.

8. The method of claim 1, further comprising:
   providing the calculated position of the user to an application that consumes position data.

9. The method of claim 8, wherein the application is one of an augmented reality (AR) application and a user guidance application.

10. The method of claim 1, wherein the one or more range finders are ultrasonic range finders.

11. The method of claim 1, wherein the one or more range finders comprise two range finders affixed to a support structure that directs the range finders to lateral sides of the user.

12. The method of claim 1, wherein the IMU is affixed to a foot of the user.

13. The method of claim 1, wherein the producing, generating, applying one or more particle filters, and applying a statistical function are implemented by a portable electronic device.

14. The method of claim 13, wherein the one or more range finders are secured to the portable electronic device.

15. An apparatus to determine a position of a user inside of a structure, comprising:
   an inertial motion unit (IMU) configured to capture acceleration and orientation data descriptive of the acceleration and orientation of a user;
   one or more range finders configured to capture range data descriptive of distances from the user to physical constraints within the structure;
   a processor;
   a memory configured to store instructions for a position determination process that are executable on the processor, the instructions for the position determination process, when executed, operable to:
      produce an estimate of the user's relative displacement based on the acceleration and orientation data captured by the IM,
      generate a cloud of particles within a model of the structure based on the estimate of the user's relative displacement, wherein each particle of the cloud of particles represents a possible position of the user,
      apply one or more particle filters to the cloud of particles to eliminate any particles of the cloud of particles that violate physical constraints and to eliminate any particles of the cloud of particles that are inconsistent with the range data captured by the one or more range finders,
      apply a statistical function to the cloud of particles to determine a calculated position of the user.

16. The apparatus of claim 15, wherein particles of the cloud of particles are determined to be inconsistent with the range data based on a weight assigned to each of the particles that is proportional to similarity between a distance in the model from the particle to a representation of the physical constraint, and a distance from the user to physical constraints within the structure.

17. The apparatus of claim 15, wherein the memory is further configured to store instructions for an application that consumes position data, and the instructions for the position determination process, when executed, are further operable to:

provide the calculated position of the user to the application that consumes position data.

18. The apparatus of claim 15, wherein the one or more range finders are ultrasonic range finders.

19. The apparatus of claim 15, wherein at least the processor and the memory are portions of a portable electronic device to which the one or more range finders are secured.

20. A non-transitory computer-readable medium that includes instructions executable on a processor, the instructions, when executed, operable to:

produce an estimate of the user's relative displacement based on captured acceleration and orientation data from an inertial motion unit (IMU) affixed to the user;

generate a cloud of particles within a model of the structure based on the estimate of the user's relative displacement, wherein each particle of the cloud of particles represents a possible position of the user;

apply one or more particle filters to the cloud of particles to
eliminate any particles of the cloud of particles that violate physical constraints, and
eliminate any particles of the cloud of particles that are inconsistent with the range data captured by the one or more range finders affixed to the user and descriptive of distances from the user to physical constraints within the structure; and apply a statistical function to the cloud of particles to determine a calculated position of the user.

* * * * *

UNITED STATES PATENT AND TRADEMARK OFFICE
CERTIFICATE OF CORRECTION

PATENT NO. : 8,504,292 B1
APPLICATION NO. : 13/101918
DATED : August 6, 2013
INVENTOR(S) : Stéphane Còté et al.

Page 1 of 1

It is certified that error appears in the above-identified patent and that said Letters Patent is hereby corrected as shown below:

In the Specification

In col. 8, line 23 should read:
returned by the IMU is double integrated ~~inters grated~~ over time to yield Signed and Sealed this
First Day of October, 2013

Teresa Stanek Rea
*Deputy Director of the United States Patent and Trademark Office*